(12) United States Patent
Saito et al.

(10) Patent No.: US 9,976,884 B2
(45) Date of Patent: May 22, 2018

(54) ELECTROMAGNETIC FLOWMETER

(71) Applicant: YOKOGAWA ELECTRIC CORPORATION, Tokyo (JP)

(72) Inventors: Masakazu Saito, Musashino (JP); Yuichi Kaneko, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days. days.

(21) Appl. No.: 15/371,335

(22) Filed: Dec. 7, 2016

(65) Prior Publication Data

US 2017/0160114 A1   Jun. 8, 2017

(30) Foreign Application Priority Data

Dec. 8, 2015   (JP) ................................. 2015-239287

(51) Int. Cl.
*G01F 1/58*   (2006.01)
(52) U.S. Cl.
CPC ...................... *G01F 1/58* (2013.01)
(58) Field of Classification Search
CPC ..................... G01F 1/56; G01F 1/58
See application file for complete search history.

(56) References Cited

U.S. PATENT DOCUMENTS

| 5,880,376 A | * | 3/1999 | Sai | ........................ | G01F 1/002 |
| | | | | | 73/861.08 |
| 6,847,901 B2 | * | 1/2005 | Suzuki | .................... | G01F 1/58 |
| | | | | | 702/100 |
| 2004/0040385 A1 | | 3/2004 | Hofmann et al. | | |
| 2016/0011025 A1 | * | 1/2016 | Shimura | ............. | G01F 25/0007 |
| | | | | | 73/861.12 |
| 2017/0176363 A1 | * | 6/2017 | Pennington | ............ | G01N 25/72 |

FOREIGN PATENT DOCUMENTS

| JP | 2003065815 A | 3/2003 |
| JP | 200485570 A | 3/2004 |
| JP | 2006-250692 A | 9/2006 |

* cited by examiner

*Primary Examiner* — Jewel V Dowtin
(74) *Attorney, Agent, or Firm* — Sughrue Mion, PLLC

(57) ABSTRACT

There is provided an electromagnetic flowmeter including a measurement tube through which fluid to be measured flows, a lining which covers an inner side of the measurement tube, electrodes which are respectively inserted into through-holes formed in the lining and which output a detection signal based on an electromotive force generated in the fluid, and a lining wear detection unit which measures a magnitude of a slurry noise included in the detection signal to detect wear of the lining. The electrodes are configured such that a portion in contact with the fluid in a state where the lining has no wear is coated with a porous insulating material. The lining wear detection unit detects the wear of the lining by comparing the magnitude of the measured slurry noise with the magnitude of the slurry noise in the state where the lining has no wear.

8 Claims, 6 Drawing Sheets

ELECTROMAGNETIC FLOWMETER

CROSS-REFERENCE TO RELATED APPLICATION

The present application claims priority from Japanese Patent Application No. 2015-239287 filed on Dec. 8, 2015, the entire content of which is incorporated herein by reference.

BACKGROUND

Technical Field

The present disclosure relates to an electromagnetic flowmeter, and more particularly, to detection of wear of a lining which covers an inner side of a measurement tube.

Related Art

An electromagnetic flowmeter for measuring a flow rate of conductive fluid by using electromagnetic induction is widely used in an industrial application or the like since it is robust and has high precision. The electromagnetic flowmeter is configured such that conductive fluid to be measured is supplied into a measurement tube to which a magnetic field is orthogonally applied and a generated electromotive force is measured by using a pair of electrodes. Since this electromotive force is proportional to a flow velocity of the fluid, a volumetric flow rate of the fluid can be obtained based on the measured electromotive force.

FIG. 7 is a sectional view of an electrode part of a related-art electromagnetic flowmeter 300. As shown in FIG. 7, an inner side of a measurement tube 310 is covered with a lining 320 and an exciting coil 340 is provided on the outside of the measurement tube 310.

The lining 320 has a role of securing wear resistance and corrosion resistance of the measurement tube 310 to the fluid in addition to securing insulation property of the measurement tube 310 to an electromotive force. Material of the lining may be selected according to the fluid to be measured and may be, for example, a fluorine resin (PFA, PTFE), a polyurethane rubber or a soft natural rubber and the like.

In the example shown in FIG. 7, a pair of electrodes 330 are machined to have a length such that a contact side surface with the fluid is flush with the surface of the lining 320. The pair of electrodes are assembled to the measurement tube 310 by being inserted from the outside thereof. As material of the electrodes 330, a metal material according to the fluid to be measured may be used.

In the measurement of slurry fluid containing solids referred to as slurry, such as gravel, sand, mud, metal pieces and plastics, the lining 320 is gradually worn over time as the slurry is brought into contact with the lining 320. When the lining 320 is worn, a channel diameter in the measurement tube 310 is changed, and thus, a measurement error referred to as a span error would occur.

In relation to the wear of the lining 320, JP-A-2006-250692 discloses a configuration where as shown in FIG. 8, a wear detection electrode 351 is embedded into the lining 320 from the measurement tube 310 and a voltage is applied between the wear detection electrode 351 and a reference potential (earth) of the measurement tube 310.

In the state where the lining 320 has no wear, the wear detection electrode 351 is not in contact with the fluid to be measured, and thus, a current does not flow between the wear detection electrode 351 and the earth. However, when the wear of the lining 320 advances and the wear detection electrode 351 is exposed, a current Ia flows between the wear detection electrode 351 and the earth through the fluid. By monitoring the current Ia, the wear of the lining 320 can be detected. Further, by providing a plurality of wear detection electrodes 351 at different heights, the degree of wear of the lining 320 can be detected.

According to the above configuration, the wear of the lining 320 can be detected. However, the wear detection electrode 351 needs to be embedded into the lining 320. Further, a circuit for monitoring the current Ia needs to be separately provided, and therefore, a configuration of an electromagnetic flowmeter becomes complicated.

SUMMARY

Accordingly, the present disclosure provides an electromagnetic flowmeter for detecting wear of a lining with a simple configuration.

According to an embodiment of the present disclosure, there is provided an electromagnetic flowmeter including: a measurement tube through which fluid to be measured flows; a lining which covers an inner side of the measurement tube; a pair of electrodes which are respectively inserted into through-holes formed in the lining and which are configured to output a detection signal based on an electromotive force generated in the fluid; and a lining wear detection unit which is configured to measure a magnitude of a slurry noise included in the detection signal to detect wear of the lining, wherein the electrodes are configured such that a portion in contact with the fluid in a state where the lining has no wear is coated with a porous insulating material, and wherein the lining wear detection unit is configured to detect the wear of the lining by comparing the magnitude of the measured slurry noise with the magnitude of the slurry noise in the state where the lining has no wear.

According to another embodiment of the present disclosure, there is provided an electromagnetic flowmeter including: a measurement tube through which fluid to be measured flows; a lining which covers an inner side of the measurement tube; a pair of electrodes which are respectively inserted into through-holes formed in the lining with a gap therebetween and which are configured to output a detection signal based on an electromotive force generated in the fluid; and a lining wear detection unit which is configured to measure a magnitude of a slurry noise included in the detection signal to detect wear of the lining, wherein the electrodes are configured such that, when a contact side with the fluid is flush with or is recessed from an inner surface of the lining in a state where the lining has no wear, an inner surface of the electrodes is coated with an insulating material, and when the contact side with the fluid protrudes from the inner surface of the lining in the state where the lining has no wear, the protruding portion is coated with an insulating material, and wherein the lining wear detection unit is configured to detect the wear of the lining by comparing the magnitude of the measured slurry noise with the magnitude of the slurry noise in the state where the lining has no wear.

According to a further embodiment of the present disclosure, there is provided an electromagnetic flowmeter including: a measurement tube through which fluid to he measured flows; a lining which covers an inner side of the measurement tube; a pair of electrodes which are respectively inserted into through-holes formed in the lining and which are configured to output a detection signal based on an electromotive force generated in the fluid; and a lining wear detection unit which is configured to measure a magnitude of a slurry noise included in the detection signal to detect wear of the lining, wherein one of the electrodes is configured such that, when a contact side with the fluid is flush with or is recessed from an inner surface of the lining in a state where the lining has no wear, an inner surface of the electrode is coated with a porous insulating material, and when the contact side with the fluid protrudes from the inner surface of the lining in the state where the lining has no wear, the protruding portion is coated with a porous insulating material, wherein the other of the electrodes is configured such that an area wider than a coated area of the one of the electrodes is coated with a porous insulating material, and wherein the lining wear detection unit is configured to determine that wear occurs on the lining when a difference between the magnitude of the measured slurry noise in the one of the electrodes and the magnitude of the slurry noise in the one of the electrode in the state where the lining has no wear exceeds a first reference value and when a difference between the magnitude of the slurry noise in the one of the electrodes and the magnitude of the slurry noise in the other of the electrodes exceeds a second reference value.

According to the above configuration, the electromagnetic flowmeter can detect wear of a lining with a simple configuration.

DETAILED DESCRIPTION

Figure 1:
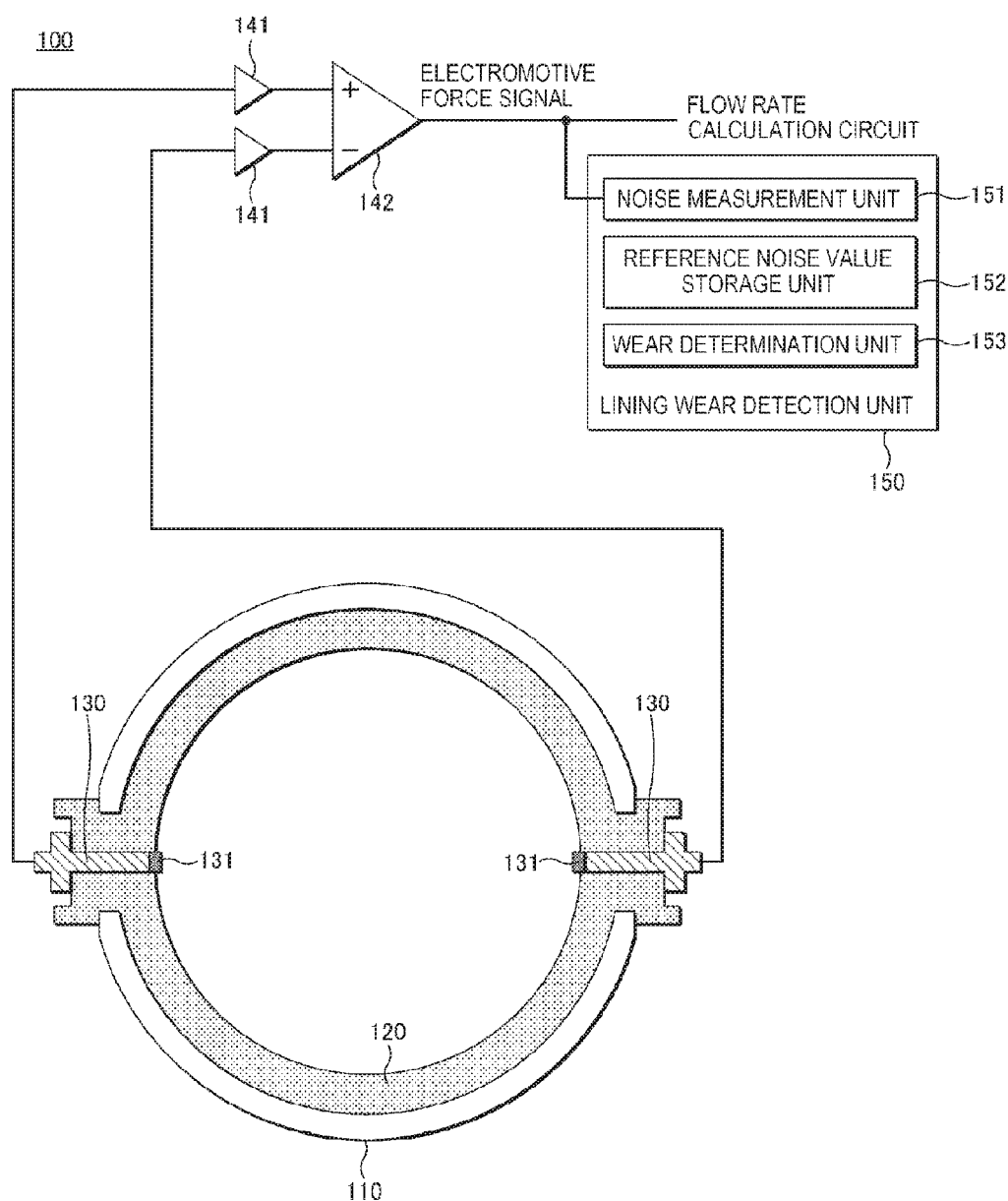
FIG. 1 is a view showing a part of an electromagnetic flowmeter according to a first embodiment of the present disclosure.

Embodiments of the present disclosure will be described with reference to the drawings. FIG. 1 is a view showing a part of an electromagnetic flowmeter 100 according to a first embodiment of the present disclosure. As shown in FIG. 1, an inner side of a measurement tube 110 is covered with a lining 120 and an exciting coil (not shown) is provided on the outside of the measurement tube 110.

In the present embodiment, each of electrodes 130 has an inner side surface which is provided on the inside of the measurement tube 110 and which is coated with an insulating porous ceramic 131. Specifically, the portion of each electrode 130 in contact with fluid to be measured at least in the state where the lining 120 has no wear is coated with the porous ceramic 131. Therefore, each electrode 130 is in contact with the fluid through fine pores of the porous ceramic 131. Incidentally, the electrodes may be coated with other porous insulating material. For example, a diamond-like carbon or the like may be used.

The lining 120 is formed with through-holes which penetrate from the inside to the outside of the measurement tube 110. Each electrode 130 is assembled to a corresponding through-hole formed in the lining 120 by being inserted from the outside of the measurement tube 110. Accordingly, sealing can be made on the outside of the measurement tube 110 by using a flange of each electrode 130, whereby the sealing property can be easily enhanced, compared to an inner insertion type. Further, the replacement or detachment of the electrodes 130 can be easily carried out from the outside.

Each electrode 130 is connected to a differential amplifier 142 through each buffer 141, and thus, an electromotive force signal is output. The electromotive force signal is input to a flow rate calculation circuit and a flow rate of the fluid to be measured is calculated in the flow rate calculation circuit.

The electromagnetic flowmeter 100 of the first embodiment further includes a lining wear detection unit 150. The lining wear detection unit 150 detects the wear of the lining 120 based on a slurry noise included in the electromotive force signal. Here, the slurry noise refers to a noise which is generated when slurry in the fluid to be measured collides with the electrodes 130 and thus DC potentials of the electrodes 130 are irregularly changed.

The lining wear detection unit 150 includes a noise measurement unit 151, a reference noise value storage unit 152 and a wear determination unit 153. Incidentally, the lining wear detection unit 150 may be configured to be incorporated into the flow rate calculation circuit.

The noise measurement unit 151 measures the magnitude of a slurry noise included in the electromotive force signal. For example, an average value of noise amplitude can be used as the magnitude of the slurry noise.

The reference noise value storage unit 152 is a storage area which stores, as a reference noise value, the magnitude of the slurry noise measured in the state where the lining 120 has no wear.

The wear determination unit 153 determines whether wear occurs on the lining 120 by comparing the magnitude of the measured slurry noise with the reference noise value stored in the reference noise value storage unit 152.

Figure 2A:
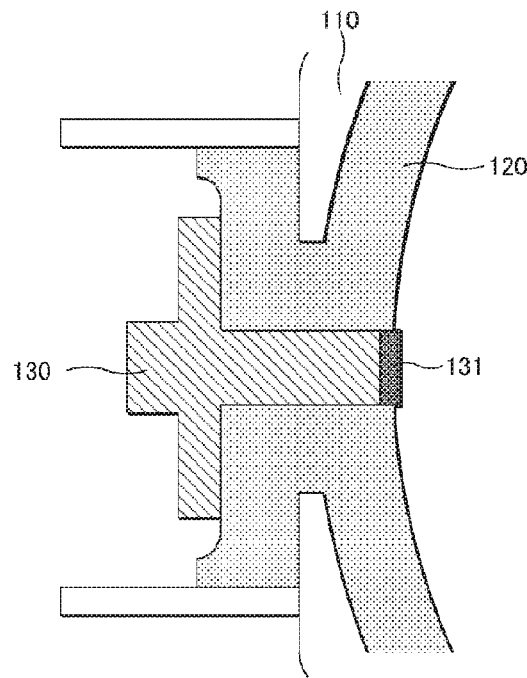
FIGS. 2A and 2B are views for explaining a relationship between the wear of a lining and the noise of slurry.

That is, in the first embodiment, as shown in FIG. 2A, the portions of the electrodes 130 in contact with the fluid to be measured in the state where the lining 120 has no wear are coated with the porous ceramics 131. Therefore, in the state where the lining 120 has no wear, the slurry in the fluid does not collide with the electrodes 130 due to the coating of the porous ceramic 131, and thus, a slurry noise is rarely generated. The magnitude of the slurry noise measured at this time is set as the reference noise value.

Figure 2B:
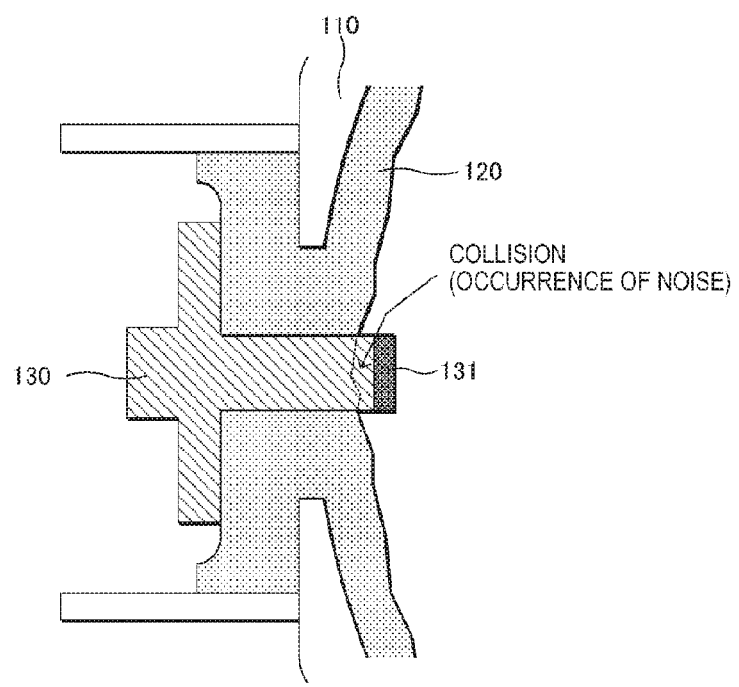

On the other hand, as the wear of the lining 120 advances, an uncoated side surface of each electrode 130 is exposed, as shown in FIG. 2B. As the slurry collides with the exposed region, a slurry noise occurs. The magnitude of the noise is increased as the size of the exposed region is increased, that is, the wear of the lining 120 advances. Therefore, the wear of the lining 120 can be determined by comparing the magnitude of the slurry noise with the reference noise value.

Figure 3:
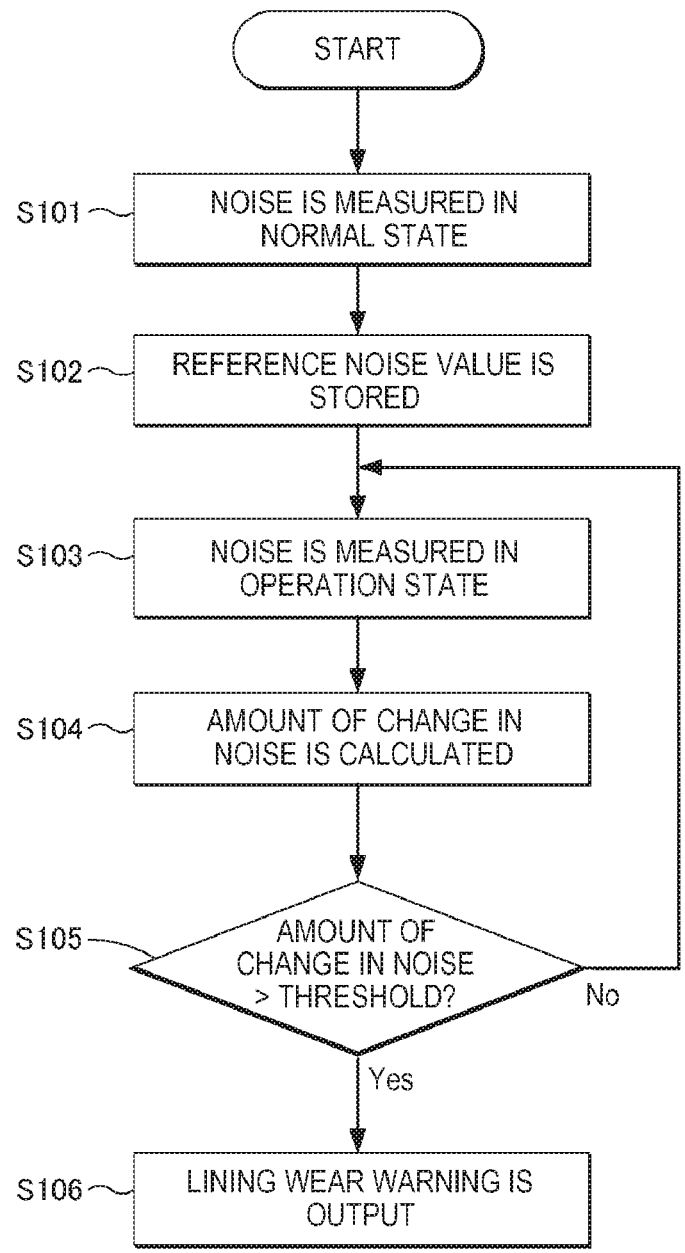
FIG. 3 is a flowchart for explaining an operation of a lining wear detection unit of the first embodiment.

Next, an operation of the lining wear detection unit 150 of the first embodiment is described with reference to the flowchart shown in FIG. 3. This operation is divided into two operations before and after the electromagnetic flowmeter 100 is operated.

First, in a normal state where the lining 120 has no wear, the magnitude of the slurry noise is measured (S101). This measurement is carried out during the installation or the like of the electromagnetic flowmeter 100, for example. Then, the measured slurry noise is stored, as the reference noise value, in the reference noise value storage unit 152 (S102). These operations correspond to the process before the electromagnetic flowmeter 100 is operated.

Since the contact surface of each electrode 130 with the fluid to be measured is coated with the porous ceramic 131, the slurry noise is rarely generated. Therefore, the reference noise value can be a small value, so that a difference between the reference noise value and the noise occurring when the lining 120 is worn can be detected with high precision.

In the process after the electromagnetic flowmeter 100 is operated, the slurry noise during operation is measured (S103). This measurement may be made online. Then, the amount of change in noise is calculated from the difference between the magnitude of the measured slurry noise and the reference noise value (S104).

Then, when the amount of change in noise calculated exceeds a predetermined threshold (S105: YES), it is determined that the wear of the lining 120 advances, and thus, a lining wear warning is output (S106). A plurality of different thresholds may be set and a warning corresponding to each threshold may be output. Accordingly, the advancement degree of wear of the lining 120 can be reported.

On the other hand, when the amount of change in noise calculated is equal to or less than the predetermined threshold (S105: NO), a warning is not output. The processes after the electromagnetic flowmeter 100 is operated are repeatedly carried out in a predetermined period of time. Incidentally, since the amount of slurry contained in the fluid to be measured is often changed, an average value of the measured slurry noise may be compared with the threshold. Averaging may be carried out by using various methods such as a simple average and a moving average.

Further, the slurry noise has a characteristic to increase in proportion to a flow velocity. Therefore, the wear of the lining 120 may be determined in consideration of a flow velocity obtained in the procedure of calculating a flow rate in the flow rate calculation circuit. For example, in the process before the electromagnetic flowmeter 100 is operated, the magnitude of the slurry noise is measured at plural flow velocities and a relationship between the flow velocity and the magnitude of the slurry noise is formularized by using a linear equation approximation and a polynomial approximation or the like.

In the process during the operation, the magnitude of the measured slurry noise is corrected by using a flow velocity at that time and a formula previously obtained, and then, the value after the correction and the threshold are compared. Accordingly, the effect of the flow velocity on the magnitude of the slurry noise can be reduced, thereby detecting the wear of the lining 120 with higher precision.

As such, according to the first embodiment of the present disclosure, the wear of the lining 120 can be detected by a simple configuration which does not require a wear detection electrode to be embedded in the lining.

Incidentally, in the above embodiment, in a normal state where the lining 120 has no wear, each electrode 130 is in contact with the fluid to be measured only through a coating of the porous ceramic 131 in order to be protected from the collision of the slurry.

Figure 4:
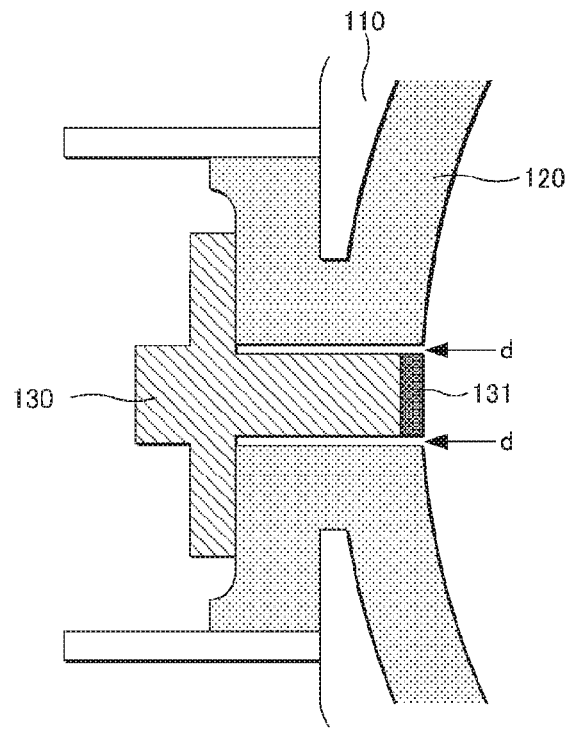
FIG. 4 shows a modification in which a gap is provided between a through-hole of the lining and a side surface of an electrode.

However, as shown in FIG. 4, a gap d may be formed between the side surface of the electrode 130 and the lining 120 while a diameter of the through-hole formed in the lining 120 is made greater than that of the electrode 130. This gap d secures a width sufficient to allow the entrance of the fluid to be measured.

This gap d allows the electrode 130 to be in contact with the fluid to be measured not only at the inner surface through the porous ceramic 131 but also at the side surface. Therefore, even when clogging occurs in the porous ceramic 131 due to the effect of the slurry, an electromotive force can be sufficiently measured and there is less effect on the measurement accuracy.

In this case, when the contact side of the electrode 130 with the fluid is flush with or is recessed from the inner surface of the lining 120 without wear, at least the inner surface of the electrode 130 is coated. Further, when the contact side protrudes from the inner surface of the lining 120 without wear, at least the entire protruding portion of the electrode 130 is coated.

Even in the case where the gap d is provided, slurry rarely collides with the side surface of the electrode 130 when the lining 120 is in a normal state. Therefore, the reference noise value having a small value is obtained. As a result, a slurry noise occurring when the wear of the lining 120 advances can be evaluated with high precision.

Figure 5:
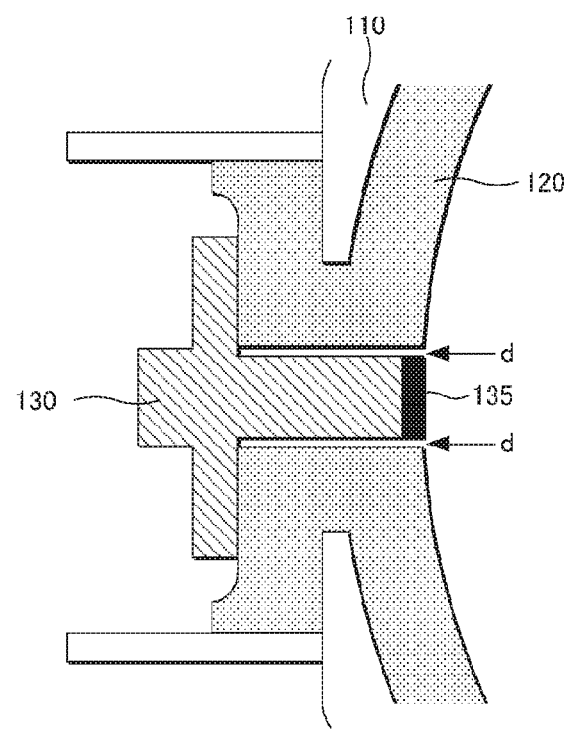
FIG. 5 shows a modification in which an electrode is coated with an insulating material impervious to water, instead of a porous ceramic.

Further, in the case where the gap d is provided, the electrode 130 can he in contact with the fluid to be measured at the side surface. Therefore, as shown in FIG. 5, the inner surface of the electrode 130 may be coated by an insulating material 135 impervious to water. Accordingly, the electrode 130 is in contact with the fluid to be measured only at the side surface.

The gap d may be not necessarily uniform over the entire side surface of the electrode 130. For example, when the gap d on the upstream side of the fluid is made smaller than the gap d on the downstream side thereof, the entrance of slurry into the gap d can be reduced such that the collision of slurry onto the side surface of the electrode 130 can be effectively reduced when the lining 120 is in a normal state. Alternatively, when the gap d in a direction intersecting with the measurement tube 110 is made lamer than the cap d in a direction of the measurement tube 110, the same effects as above can he achieved, irrespective of the flow direction of the fluid to be measured.

Further, the shape of the electrode 130 is not limited to a cylindrical shape. The electrode 130 may have a conical shape or a prism shape. Furthermore, the electrode 130 may have a peak shape whose tip side becomes thinner by a combination of a cylindrical shape and a conical shape.

Figure 6:
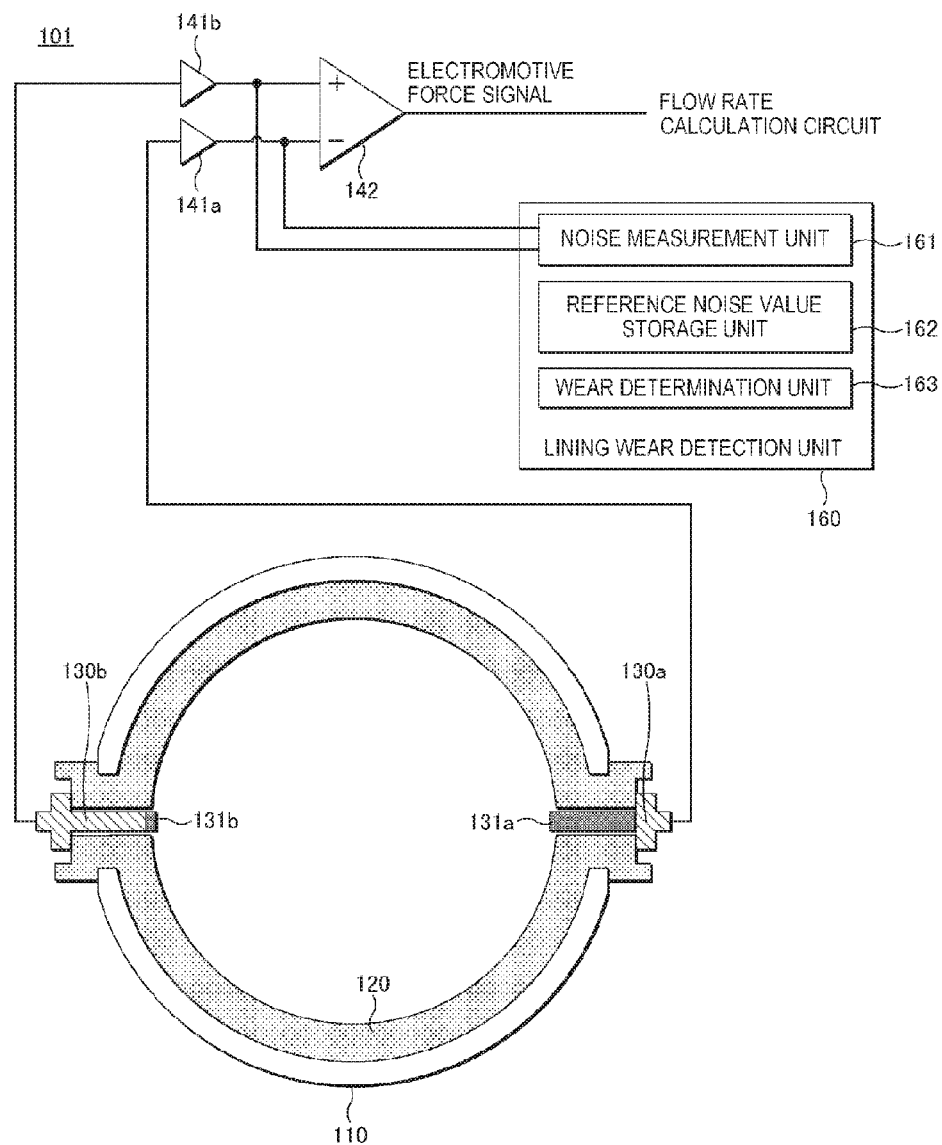
FIG. 6 is a view showing a part of an electromagnetic flowmeter according to a second embodiment of the present disclosure.
Figure 7:
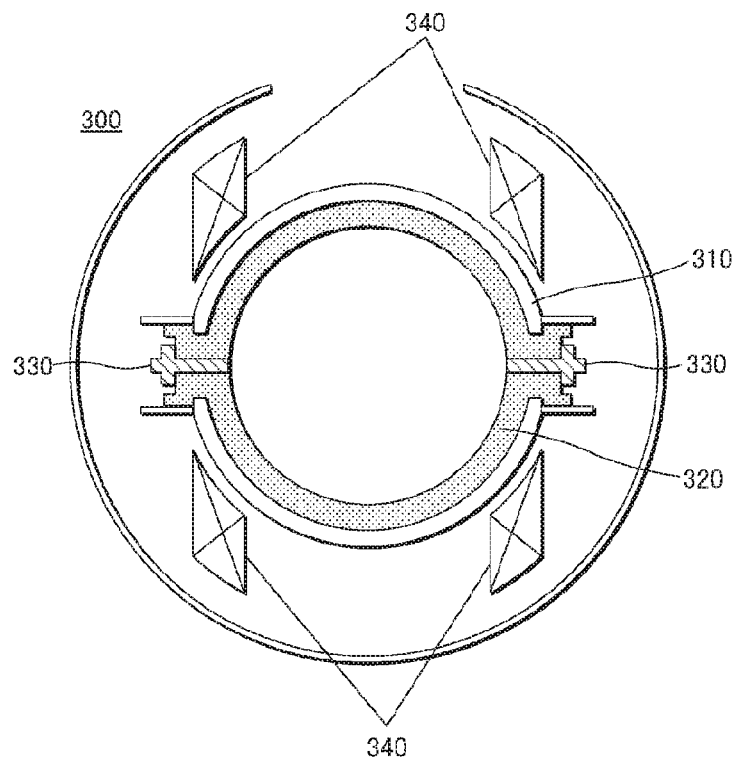
FIG. 7 is a sectional view of an electrode part of a related-art electromagnetic flowmeter.
Figure 8:
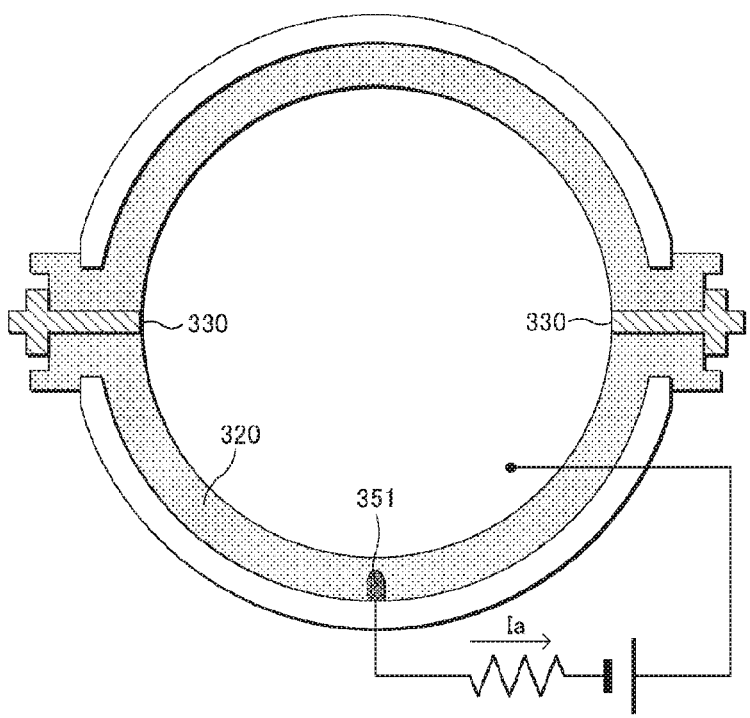
FIG. 8 is a view for explaining related-art lining wear detection.

Next, a second embodiment of the present disclosure is described. FIG. 6 is a view showing a part of an electromagnetic flowmeter 101 according to the second embodiment of the present disclosure. The same or similar part will be denoted by the same reference numeral as that of the first embodiment. As shown in FIG. 6, an inner side of a measurement tube 110 is covered with a lining 120 and an exciting coil (not shown) is provided on the outside of the measurement tube 110.

Further, a gap d is formed between the side surface of an electrode 130 and the lining 120 while a diameter of a through-hole formed in the lining 120 is made greater than that of the electrode 130. This gap d secures a width sufficient to allow the entrance of the fluid to be measured. Here, the gap d may be omitted.

In the present embodiment, one electrode A 130a is configured such that not only the inner surface provided on the inside of the measurement tube 110, but also the side surface is coated with an insulating porous ceramic 131a. That is, the entire contact portion of the one electrode A 130a with the fluid is coated with the porous ceramic 131a. Further, the other electrode B 130b is configured such that only the inner surface provided on the inside of the measurement tube 110 is coated with an insulating porous ceramic 131b.

The electrode A 130a and the electrode B 130b are respectively connected to a differential amplifier 142 through a buffer 141a and a buffer 141b, and thus, an electromotive force signal is output. The electromotive force signal is input to a flow rate calculation circuit and a flow rate of the fluid is calculated in the flow rate calculation circuit.

The electromagnetic flowmeter 101 of the second embodiment further includes a lining wear detection unit 160. The lining wear detection unit 160 detects the wear of the lining 120 based on a slurry noise included in the detection signal of each of the electrode A 130a and the electrode B 130b. Therefore, not an electromotive force signal but a signal output from each of the buffer A 141a and the buffer B 141b is input to the lining wear detection unit 160.

The lining wear detection unit 160 includes a noise measurement unit 161, a reference noise value storage unit 162 and a wear determination unit 163. Incidentally, the lining wear detection unit 160 may be configured to be incorporated into a flow rate calculation circuit.

The noise measurement unit 161 measures the magnitude of a slurry noise included in the detection signal of the electrode A 130a and the magnitude of a slurry noise included in the detection signal of the electrode B 130b. For example, an average value of noise amplitude may be used as the magnitude of the slurry noise.

In the second embodiment, the side surface of the electrode A 130a is also coated with the porous ceramic 131a. Therefore, the magnitude of the slurry noise is not increased even when the wear of the lining 120 advances. That is, only the magnitude of the slurry noise of the electrode B 130b is increased when the wear of the lining 120 advances.

Therefore, in the second embodiment, it is assumed to use the detection signal of the electrode B 130b in determining the wear. Further, the detection signal of the electrode A 130a is auxiliary used in order to increase the reliability of the wear determination.

The reference noise value storage unit 162 is a storage area which stores, as the reference noise value, the magnitude of the slurry noise contained in the detection signal of the electrode B 130b in the state where wear does not occur on the lining 120.

In the second embodiment, the wear determination unit 163 performs wear determination of the lining 120 after the operation in the following procedure in the process before the operation, the magnitude of the slurry noise included in the detection signal of the electrode B 130b in the state where the lining 120 has no wear is previously stored, as the reference noise value, in the reference noise value storage unit 162.

In the process after the operation, the slurry noise which occurs in the electrode A 130a and the electrode B 130b during the operation is respectively measured. Then, the amount of change in noise is calculated from a difference between the magnitude of the slurry noise occurring in the electrode B 130b and the reference noise value.

Then, when the amount of change in noise calculated exceeds a predetermined threshold (first threshold), it is determined that there is a possibility that the wear of the lining 120 advances.

in this case, additionally the magnitude of the slurry noise in the electrode A 130a and the magnitude of the slurry noise in the electrode B 130b are compared. The slurry noise due to the wear of the lining 120 is not increased in the electrode A 130a. Therefore, when the magnitude of the slurry noise in the electrode A 130a and the magnitude of the slurry noise in the electrode B 130b are substantially the same, it is determined that the wear of the lining 120 is not advanced and the slurry noise is generated by other factors. Also in this case, a warning may be output.

On the other hand, when the magnitude of the slurry noise in the electrode B 130b is sufficiently larger than that of the slurry noise in the electrode A 130a, it is determined that the wear of the lining 120 advances, and a lining wear warning is output. Incidentally, a predetermined reference value (second threshold) can be used in determining whether the magnitude of the slurry noise in the electrode A 130a and the magnitude of the slurry noise in the electrode B 130b are substantially the same or the magnitude of the slurry noise in the electrode B 130b is sufficiently larger than that of the slurry noise in the electrode A 130a.

As such, in the second embodiment, the reliability in the wear determination of the lining 120 is improved by using the electrode B 130b where the slurry noise is increased with the advance of wear of the lining 120 and the electrode A 130a where the slurry noise is not associated with the advance of wear of the lining 120.

The foregoing description of the embodiments of the present disclosure has been provided for the purposes of illustration and description. It is not intended to be exhaustive or to limit the invention to the precise forms disclosed.

What is claimed is:

1. An electromagnetic flowmeter comprising:
   a measurement tube through which fluid to be measured flows;
   a lining which covers an inner side of the measurement tube;
   a pair of electrodes which are respectively inserted into through-holes formed in the lining and which are configured to output a detection signal based on an electromotive force generated in the fluid; and
   a lining wear detection unit which is configured to measure a magnitude of a slurry noise included in the detection signal to detect wear of the lining,
   wherein the electrodes are configured such that a portion in contact with the fluid in a state where the lining has no wear is coated with a porous insulating material, and
   wherein the lining wear detection unit is configured to detect the wear of the lining by comparing the magnitude of the measured slurry noise with the magnitude of the slurry noise in the state where the lining has no wear.

2. The electromagnetic flowmeter according to claim 1, further comprising:
   a flow rate calculation circuit which is configured to calculate a flow velocity of the fluid to calculate a flow rate of the fluid,
   wherein the lining wear detection unit is configured to correct the magnitude of the measured slurry noise based on the flow velocity of the fluid and detect the wear of the lining by comparing the corrected magnitude of the measured slurry noise with the magnitude of the slurry noise in the state where the lining has no wear.

3. An electromagnetic flowmeter comprising:
   a measurement tube through which fluid to be measured flows;

a lining which covers an inner side of the measurement tube;

a pair of electrodes which are respectively inserted into through-holes formed in the lining with a gap therebetween and which are configured to output a detection signal based on an electromotive force generated in the fluid; and a lining wear detection unit which is configured to measure a magnitude of a slurry noise included in the detection signal to detect wear of the lining, wherein the electrodes are configured such that, when a contact side with the fluid is flush with or is recessed from an inner surface of the lining in a state where the lining has no wear, an inner surface of the electrodes is coated with an insulating material, and when the contact side with the fluid protrudes from the inner surface of the lining in the state where the lining has no wear, the protruding portion is coated with an insulating material, and wherein the lining wear detection unit is configured to detect the wear of the lining by comparing the magnitude of the measured slurry noise with the magnitude of the slurry noise in the state where the lining has no wear.

4. The electromagnetic flowmeter according to claim 3, wherein the insulating material is impervious to water.

5. The electromagnetic flowmeter according to claim 3, wherein the insulating material includes a porous material.

6. The electromagnetic flowmeter according to claim 3, wherein the gap on an upstream side of the fluid is smaller than the gap on a downstream side of the fluid.

7. The electromagnetic flowmeter according to claim 3, wherein the gap in a direction intersecting the measurement tube is larger than the gap in a direction of the measurement tube.

8. An electromagnetic flowmeter comprising:
a measurement tube through which fluid to be measured flows;

a lining which covers an inner side of the measurement tube;

a pair of electrodes which are respectively inserted into through-holes formed in the lining and which are configured to output a detection signal based on an electromotive force generated in the fluid; and a lining wear detection unit which is configured to measure a magnitude of a slurry noise included in the detection signal to detect wear of the lining, wherein one of the electrodes is configured such that, when a contact side with the fluid is flush with or is recessed from an inner surface of the lining in a state where the lining has no wear, an inner surface of the electrode is coated with a porous insulating material, and when the contact side with the fluid protrudes from the inner surface of the lining in the state where the lining has no wear, the protruding portion is coated with a porous insulating material, wherein the other of the electrodes is configured such that an area wider than a coated area of the one of the electrodes is coated with a porous insulating material, and wherein the lining wear detection unit is configured to determine that wear occurs on the lining when a difference between the magnitude of the measured slurry noise in the one of the electrodes and the magnitude of the slurry noise in the one of the electrode in the state where the lining has no wear exceeds a first reference value, and when a difference between the magnitude of the slurry noise in the one of the electrodes and the magnitude of the slurry noise in the other of the electrodes exceeds a second reference value.

* * * * *